United States Patent
Xue et al.

(10) Patent No.: US 11,846,850 B2
(45) Date of Patent: Dec. 19, 2023

(54) DISPLAY PANEL AND DISPLAY DEVICE

(71) Applicants: MIANYANG HKC OPTOELECTRONICS TECHNOLOGY CO., LTD, Mianyang (CN); HKC CORPORATION LIMITED, Shenzhen (CN)

(72) Inventors: Xinghao Xue, Mianyang (CN); Haijiang Yuan, Mianyang (CN)

(73) Assignees: MIANYANG HKC OPTOELECTRONICS TECHNOLOGY CO., LTD, Mianyang (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/079,794

(22) Filed: Dec. 12, 2022

(65) Prior Publication Data
US 2023/0273484 A1    Aug. 31, 2023

(30) Foreign Application Priority Data
Feb. 28, 2022    (CN) .......................... 202210185262.4

(51) Int. Cl.
*G02F 1/1339*    (2006.01)
(52) U.S. Cl.
CPC ...... *G02F 1/13396* (2021.01); *G02F 1/13394* (2013.01)
(58) Field of Classification Search
CPC .......................... G02F 1/13396; G02F 1/13394
See application file for complete search history.

(56) References Cited

U.S. PATENT DOCUMENTS

| | | | |
|---|---|---|---|
| 10,254,593 B2 * | 4/2019 | Gao | G02F 1/13392 |
| 2004/0263766 A1 * | 12/2004 | Lee | G02F 1/13394 |
| | | | 349/156 |
| 2012/0105510 A1 * | 5/2012 | Nakanishi | G09G 3/3655 |
| | | | 345/89 |
| 2015/0069374 A1 * | 3/2015 | Yamazaki | H10K 50/8428 |
| | | | 257/40 |

FOREIGN PATENT DOCUMENTS

| | | | |
|---|---|---|---|
| CN | 201867558 U | | 6/2011 |
| CN | 202166809 U | * | 3/2012 |
| CN | 105137666 A | | 12/2015 |
| CN | 113867055 A | | 12/2021 |

* cited by examiner

*Primary Examiner* — Michael H Caley
*Assistant Examiner* — Agnes Dobrowolski

(57) ABSTRACT

A display panel and a display device are disclosed. The display panel includes a first substrate, a second substrate, and a liquid crystal. The first substrate and the second substrate are aligned and assembled together. The liquid crystal is filled between the first substrate and the second substrate. The display panel further includes a retaining wall that is arranged on the first substrate and that extends toward the second substrate. The retaining wall divides a display region of the display panel into at least two partitions. The liquid crystal is filled in the at least two partitions. The retaining wall obstructs the liquid crystal from flowing across the different partitions.

12 Claims, 4 Drawing Sheets

DISPLAY PANEL AND DISPLAY DEVICE

CROSS-REFERENCE TO RELATED APPLICATIONS

This application claims the priority and benefit of Chinese patent application 2022101852624, titled "Display Panel and Display Device" and filed Feb. 28, 2022, with China National Intellectual Property Administration, the entire contents of which are incorporated herein by reference.

TECHNICAL FIELD

This application relates to the field of display technology, and more particularly relates to a display panel and a display device.

BACKGROUND

The description provided in this section is intended for the mere purpose of providing background information related to the present application but doesn't necessarily constitute prior art.

The phenomenon of display non-uniformity in TFT-LCD (thin film transistor liquid crystal display) has long been present, but the degree is different, and there are also different reasons for its formation. Under different display modes, there will be different states of display non-uniformity. The phenomenon of display non-uniformity in the panel is collectively referred to as "mura".

The phenomenon of "moving mura" (pressing) means that the LCD may have display non-uniformity with uneven brightness under the black screen, and after pressing and touching by hand, the volume of liquid crystal at this mura position changes, but the mura still exists and does not change after the external force is removed, and it is further clearly visible at low grayscale levels or in the shutdown state. The existence of moving mura severely affects the display quality of the panel and reduces the yield of the product, which leads to the decline of the product grade and indirectly increases the production cost. Therefore, the display non-uniformity caused by "moving mura" is an urgent problem to be solved.

SUMMARY

It is therefore a purpose of the present application to provide a display panel and a display device, where a retaining wall is arranged to divide the display region into at least two partitions, and the fluidity of liquid crystals between different partitions is hindered by the retaining wall, whereby the display non-uniformity problem caused by "moving mura" is improved.

The present application discloses a display panel including a first substrate, a second substrate and a liquid crystal. The first substrate and the second substrate are aligned and assembled together. The liquid crystal is filled between the first substrate and the second substrate. The display panel also includes a retaining wall. The retaining wall is arranged on the first substrate and extends toward the second substrate. The retaining wall divides the display region of the display panel into at least two partitions. the liquid crystal is filled in the partitions. The retaining wall blocks the flow of the liquid crystal between the different partitions.

In some embodiments, the display panel further includes a signal line. The signal lines are arranged in a crisscross pattern to form a plurality of pixel regions. The retaining wall is arranged corresponding to the signal line, and divides the display region of the display panel into a plurality of rectangular partitions. The size of each of the rectangular partitions is greater than or equal to 1 cm*1 cm.

In some embodiments, each of the rectangular partitions has the same size.

In some embodiments, the display panel further includes a black matrix, the black matrix is disposed corresponding to the signal lines, and the width of the retaining wall is smaller than or equal to the width of the black matrix.

In some embodiments, the display panel further includes a main spacer and an auxiliary spacer. One end of the main spacer abuts with the first substrate, and the other end abuts with the second substrate. The height of the auxiliary spacer is less than the height of the main spacer. The height of the retaining wall is smaller than the height of the main spacer and greater than or equal to the height of the auxiliary spacer.

In some embodiments, the display panel further includes a main spacer and an auxiliary spacer. One end of the main spacer abuts with the first substrate, and the other end abuts with the second substrate. The height of the auxiliary spacer is less than the height of the main spacer. The height of the retaining wall is equal to the height of the main spacer. The retaining wall divides the display region of the display panel into at least two partitions. At least one gap is provided in the retaining wall between the adjacent partitions. The liquid crystal flows between the different partitions through the gap.

In some embodiments, the retaining wall is made of the same material as the main spacer. The main spacer includes at least a first main spacer. The first main spacer includes the retaining wall and a boss disposed on the retaining wall. One end of the boss away from the retaining wall abuts against the second substrate.

In some embodiments, one end of the auxiliary spacer is disposed on the first substrate, and the other end is suspended from the second substrate. The second substrate is provided with a protruding structure, and the protruding structure abuts with the auxiliary spacer and/or the retaining wall to form the main spacer.

In some embodiments, the retaining wall adopts any one of a spacer material, a color filter material and/or a planarization layer material.

The present application further discloses a display device, comprising a backlight module and any one of the display panels disclosed in the present application. The backlight module is arranged on a side of a light incident surface of the display panel.

Compared with the art where the liquid crystal is filled in the display region of the display panel such that the moving mura will lead to a serious display unevenness problem, in the present application, the retaining wall is arranged on the first substrate to divide the display region of the display panel into at least two partitions. The liquid crystal is uniformly filled in each partition, and when the display panel is pressed or touched by an external force, the retaining wall will prevent the liquid crystal from flowing between the different partitions, thus limiting the flow rate of the liquid crystal to a certain extent. Due to the existence of the retaining wall, in the area where the moving mura appears, the liquid crystal cannot quickly flow from the current partition to other partitions, which reduces the flow rate of the liquid crystal and ensures that the amount of the liquid crystal in the current partition is maintained within a stable range, so as to ensure that the cell thickness in the current area does not change, or has a small change, which can improve the display non-uniformity caused by Moving mura. In addition, the retaining wall also occupies a certain volume of the liquid crystal, which can significantly reduce the amount of the liquid crystal, thereby reducing the production cost and improving the market competitiveness of the display panel.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

Figure 1:
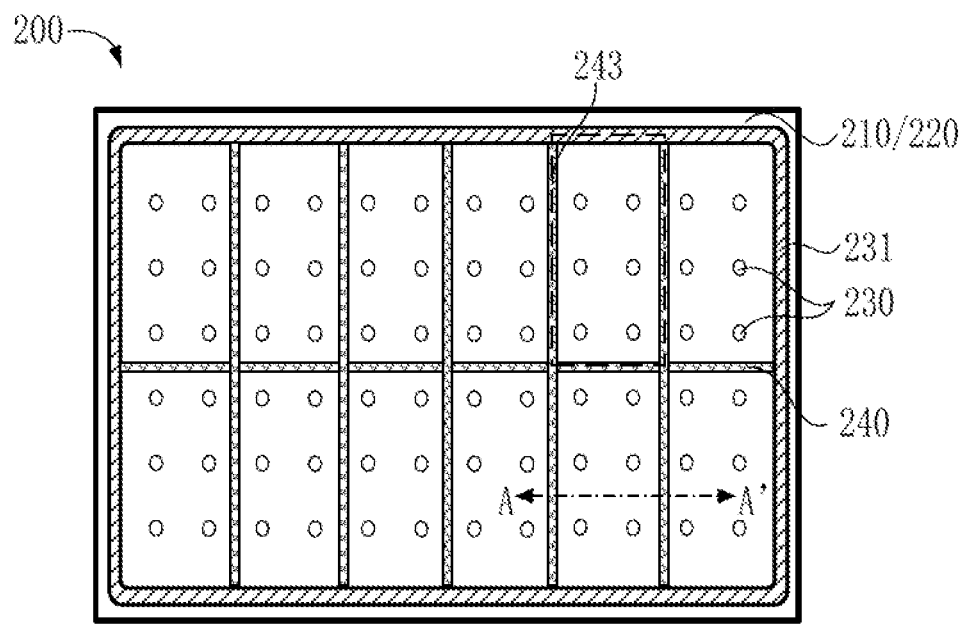
FIG. 1 is a schematic top view of a display panel according to a first embodiment of the present application.

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

Embodiment 1

Figure 2:
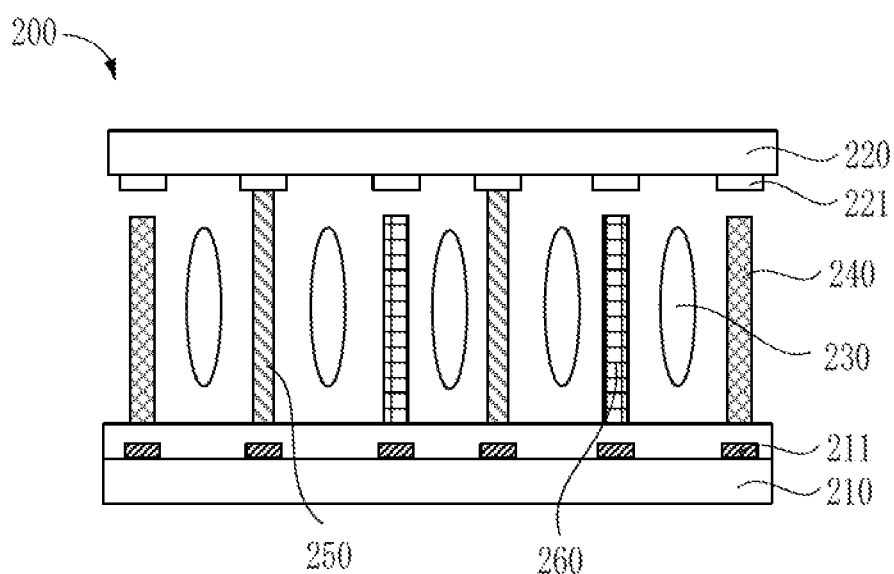
FIG. 2 is a schematic cross-sectional view taken along line A-A' shown in FIG. 1.

FIG. 1 is a schematic top view of a display panel according to Embodiment one of the present application. FIG. 2 is a schematic cross-sectional view taken along line A-A' shown in FIG. 1. As shown in FIG. 1 and FIG. 2, the present application discloses a display panel 200, including a first substrate 210, a second substrate 220, and a liquid crystal 230. The first substrate 210 and the second substrate 220 are aligned and assembled together. The liquid crystal 230 is filled between the first substrate 210 and the second substrate 220. The display panel 200 further includes a retaining wall 240. The retaining wall 240 is disposed on the first substrate 210 and extends toward the second substrate 220. The retaining wall 240 divides the display region of the display panel 200 into at least two partitions 243. The liquid crystal 230 is filled in the partitions 243. The retaining wall 240 prevents the liquid crystal 230 from flowing between the different partitions 243.

Compared with the art where the liquid crystal 230 is filled in the display region of the display panel 200 such that the moving mura will lead to a serious display unevenness problem, in the present application, the retaining wall 240 is arranged on the first substrate 210 to divide the display region of the display panel 200 into at least two partitions 243. The liquid crystal 230 is uniformly filled in each partition 243, and when the display panel 200 is pressed or touched by an external force, the retaining wall 240 will prevent the liquid crystal 230 from flowing between the different partitions 243, thus limiting the flow rate of the liquid crystal 230 to a certain extent. Due to the existence of the retaining wall 240, in the area where the moving mura appears, the liquid crystal 230 cannot quickly flow from the current partition 243 to other partitions 243, which reduces the flow rate of the liquid crystal 230 and ensures that the amount of the liquid crystal 230 in the current partition 243 is maintained within a stable range, so as to ensure that the cell thickness in the current area does not change, or has a small change, which can improve the display non-uniformity caused by Moving mura. In addition, the retaining wall 240 also occupies a certain volume of the liquid crystal 230, which can significantly reduce the amount of the liquid crystal 230, thereby reducing the production cost and improving the market competitiveness of the display panel 200.

The first substrate 210 may be an array substrate, or a color filter substrate, or a COA substrate (the color filter layer is fabricated on the array substrate), or a counter substrate. Correspondingly, the second substrate 220 may be a color filter substrate, or an array substrate, or a counter substrate, or a COA substrate. This application only takes the first substrate 210 as an array substrate and the second substrate 220 as a color filter substrate as an example for description.

Specifically, the display panel 200 further includes a plurality of signal lines 211. The signal lines 211 are arranged in a crisscross pattern to form a plurality of pixel regions (not shown in the figure). The retaining wall 240 is disposed corresponding to the signal lines 211 and divides the display region of the display panel 200 into a plurality of rectangular partitions 243. The size of each rectangular partition 243 is greater than or equal to 1 cm*1 cm.

The display panel 200 may be further provided with signal lines 211, and the signal transmission between the substrates is realized through the signal lines 211. The signal lines 211 specifically include scan lines and data lines. Data lines and scan lines are arranged in a crisscross pattern to form multiple pixel regions. The display panel 200 is also provided with an alignment film, a pixel electrode or a common electrode to deflect the liquid crystals, and a display image is realized through the driving sequence of different pixel regions. The retaining wall 240 is fabricated on the first substrate 210 and divides the display panel 200 into at least two partitions 243. At this time, the retaining wall 240 can be arranged corresponding to the signal lines 211. The retaining wall 240 may be a strip-shaped structure extending laterally or vertically along the display panel 200, that is, the retaining wall 240 may be arranged corresponding to the scan lines or data lines. The strip structure may be in the number of one or multiple, and divide the display region of the display panel 200 into at least two partitions 243. Of course, the retaining wall 240 may also be a grid structure formed by crisscrossing arrangement, and be arranged corresponding to the position of the scan lines and the data lines, thus dividing the display region of the display panel 200 into a plurality of rectangular partitions 243. Both configurations can be used to partition the display region 243, prevent the liquid crystal 230 in the display region from flowing between different partitions 243, and improve the display unevenness caused by the Moving mura.

During the manufacturing process of the display panel 200, the liquid crystal 230 may be dropped on the first substrate 210 by a liquid crystal dropping process. In the process of dropping the liquid crystal, the liquid crystal 230 is not dropped in every pixel region. In order to improve the fluidity of the liquid crystal 230 and ensure the uniformity of the filling of the liquid crystal 230 in each pixel region, the retaining wall 240 in this embodiment is not arranged corresponding to each data line or scan line, but arranged corresponding to the positions of some data lines or scan lines, thus dividing the display region into multiple rectangular partitions 243, where the size of each rectangular partition 243 is greater than or equal to 1 cm*1 cm. The size of each pixel region may be (0.1 mm*0.1 mm)-(0.2 mm*0.2 mm), so that each rectangular partition 243 covers multiple pixel regions, ensuring the same amount of liquid crystal in multiple pixel regions, and avoiding display non-uniformity between different pixel regions due to different liquid crystal amounts. At the same time, the retaining wall 240 limits the flow rate of the liquid crystal 230, which improves the display unevenness caused by the moving mura.

In addition, the display panel 200 further includes a black matrix 221. The black matrix 221 is disposed corresponding to the signal lines 211, and the width of the retaining wall 240 is smaller than or equal to the width of the black matrix 221. In order to ensure the display effect of the display panel 200, a black matrix 221 is further arranged at the position corresponding to the signal lines 211 to block the entire area on the first substrate 210 or the second substrate 220 except the pixel regions, so as to avoid color mixing or abnormal display caused by light leakage at other locations. At this time, the width of the retaining wall 240 is set to be smaller than or equal to the width of the black matrix 221, which can hinder the fluidity of the liquid crystal 230 between the different partitions 243 while ensuring the aperture ratio of the display panel 200, thereby improving the display unevenness caused by the moving mura.

Specifically, the black matrix 221 and the signal lines 211 can be arranged on the same substrate. For example, the black matrix 221 and the signal lines 211 may be arranged on the array substrate, and the color filter layer may be arranged on the array substrate. That is, when the array substrate is a COA substrate, the black matrix 221 can be arranged on the same layer as the color filter layer. Of course, the black matrix 211 can also be arranged on the counter substrate to increase the light shielding effect. In addition, the black matrix 221 and the signal lines 211 may also be arranged on different substrates. For example, when the signal lines 211 are arranged on the array substrate, the black matrix 221 is arranged on the color filter substrate, and the color filter layer is arranged on the color filter substrate, then the black matrix 221 and the color filter layer can be arranged on the same layer.

Further, since the force acted on the display panel 200 when it is subjected to an external force or to a pressing test is random, the probability of occurrence of Moving mura in each rectangular partition 243 is the same, in order to better improve the problem of display non-uniformity caused by Moving mura, each rectangular partition 243 is the same size. That is, the display region is divided into a plurality of rectangular sub-regions 243 of a uniform size, so that the liquid crystal quantity of the liquid crystal 230 in any matrix partition 243 is made the same. At the same time, when the Moving mura occurs, the liquid crystal quantity in each matrix partition 243 is the same, and the display region is fully filled. Therefore, the flow rates of the liquid crystal 230 in the pressing area from the current matrix partition 243 to the other matrix partitions 243 are the same. Due to the blocking effect of the retaining wall 240, the flow rate is slowed down, and the original state can be quickly restored after the pressing is removed, which can effectively improve the problem of display non-uniformity.

It is obtained from actual production experience that the smaller the grid unit of the partitions 243 formed by the retaining wall 240 is, the more obvious the effect of improving the display unevenness caused by the Moving mura is. The size of each rectangular partition 243 may be set to be greater than or equal to 1 cm*1 cm. When the size of the rectangular partition 243 is 1 cm*1 cm, it can not only accommodate a drop of liquid crystal 230, but also ensure that the corresponding amount of liquid crystal in each minimum area is the same. Moreover, the smaller the size of each rectangular partition 243 is, the more uniform the liquid crystal distribution is, and the better the effect of improving the Moving mura is.

However, in actual production, when the liquid crystal 230 is dropped, an LC pattern (liquid crystal pattern) may be used. The size of the LC pattern commonly used in general production is a grid shape of 2 cm*2 cm, and each 2 cm*2 cm grid has at least one liquid crystal dropping port. When the size of the rectangular partition 243 completely matches the size of the LC pattern, when the liquid crystal 230 is dropped, the liquid crystal 230 in one LC pattern grid can just fill one rectangular partition 243, and it can also ensure that the amount of liquid crystal in each rectangular partition 243 is the same, avoiding the phenomenon of uneven liquid crystal volume caused by insufficient liquid crystal 230 when the liquid crystal is dropped, or caused by the liquid crystal 230 spanning at least two partitions 243. Therefore, the size of each rectangular partition 243 may be set to be the same as the size of the grid in the LC pattern. That is, the size of each rectangular partition 243 is set to 2 cm*2 cm. In this way, there is at least one drop of liquid crystal 230 in each grid of 2 cm*2 cm, which can ensure that there is at least one drop of liquid crystal 230 in each rectangular partition 243, and will not affect the diffusion of liquid crystal 230 in the entire display region, ensuring better uniformity of the liquid crystal 230 in each partition 243.

Furthermore, when the size of each rectangular partition 243 is set to 2 cm*2 cm, the formed retaining wall 240 has the same size as each grid in the LC pattern. When the liquid crystal is dropped, the liquid crystal 230 in each LC pattern grid corresponds to a rectangular partition 243. In the liquid crystal dropping stage, it can ensure that the amount of liquid crystal in each rectangular partition 243 in the display region is sufficient and the same. In addition, since the size of each rectangular partition 243 is the same, the dropping amount of the liquid crystal 230 is also the same, so that the diffusion and uniformity of the liquid crystal 230 in each rectangular partition 243 tend to be consistent. This can ensure the uniformity of the liquid crystal 230 in each area under the normal cell alignment of the display panel 200. Moreover, due to the existence of the retaining wall 240, the fluidity of the liquid crystal 230 may be hindered. Even if the display panel 200 is subjected to an external force, the amount of the liquid crystal 230 in each rectangular partition 243 can be stabilized, which effectively improves the moving mura phenomenon.

In addition, when the size of the rectangular partition 243 is the same as that of the LC pattern, then there is no need to design a new shape of the LC pattern, which saves production costs. Of course, each rectangular partition 243 may also include multiple droplets of liquid crystal 230. That is, a group of several liquid crystals 230 forms a rectangular partition 243. In this way, the size and shape of the rectangular partition 243 can be designed based on the LC pattern, and the partitions 243 formed by the retaining wall 240 can be more precise.

Of course, the size of each matrix partition 243 may also be different. That is, the size of the rectangular partitions 243 corresponding to the central portion of the display region may be smaller than the size of the rectangular partitions 243 corresponding to the edge portions of the display region. The larger the size of the display panel 200 is, the larger the area of the display region is, and a sealant 231 may be arranged at the edges of the display region to seal the liquid crystal 230. Due to the blocking of the edge sealant 231, the liquid crystal 230 in the central portion of the display region is more concentrated, and when the display panel 200 is pressed, the liquid crystal 230 in the central portion is more fluid. Therefore, the size of the rectangular partitions 243 corresponding to the central portion of the display region can be relatively smaller, so that the liquid crystal 230 in the central portion can be divided more densely, which can well improve the display unevenness caused by the Moving mura. Moreover, the display panel 200 is normally placed vertically, and the matrix partitions 243 in the central portion can be set smaller, which can effectively prevent the liquid crystal 230 from flowing to the edges of the display region, and reduce the problem of display non-uniformity caused by uneven distribution of the liquid crystal 230.

In order to ensure that the cell thickness of the display panel 200 is uniform, the display panel 200 further includes a main spacer 250 and an auxiliary spacer 260. One end of the main spacer 250 abuts with the first substrate 210 and the other end abuts with the second substrate 220. The height of the auxiliary spacer 260 is smaller than that of the main spacer 250. The height of the retaining wall 240 is smaller than the height of the main spacer 250 and greater than or equal to the height of the auxiliary spacer 260.

The main spacer 250 mainly plays a supporting role, and abuts against the first substrate 210 and the second substrate 220, thus maintaining the cell thickness stability of the display panel 200. The height of the auxiliary spacer 260 is smaller than that of the main spacer 250. When the display panel 200 is subjected to an external force or a pressure test is performed, after the main spacer 250 slides, the auxiliary spacer 260 plays a role of supporting the two substrates. Generally, the arrangement density of the main spacers 250 is greater than that of the auxiliary spacers 260. In order to ensure the fluidity of the liquid crystal 230 between the partitions 243, and to ensure that the liquid crystal volume in the partitions 243 is uniform under the normal cell alignment of the display panel 200, the height of the retaining wall 240 is set to be smaller than the height of the main spacer 250 and greater than or equal to the height of the auxiliary spacer 260, so that when the display panel 200 is normally assembled, there is a certain gap between the end of the retaining wall 240 and the second substrate 220, and the liquid crystals 230 in the plurality of partitions 243 can flow freely through the gap, preventing the display non-uniformity in the assembled state. Specifically, the distance between the retaining wall 240 and the second substrate 220 is about 0.3 μm, which will not affect the cell thickness of the display panel 200. At the same time, since the height of the retaining wall 240 is smaller than that of the main spacer 250, after the display panel 200 is stressed, the retaining wall 240 can also play a certain supporting role together with the auxiliary spacer 260, and can also share a part of the stress with the auxiliary spacer 260, so that the display panel 200 can bear more pressure, which is especially suitable for a touch screen.

In this embodiment, the height of the retaining wall 240 may be set equal to the height of the auxiliary spacer 260. In this way, when the auxiliary spacer 260 and the retaining wall 240 are disposed on the first substrate 210, and the main spacer 250 is disposed on the second substrate 220, the same exposure and development process can be used to form the auxiliary spacer 260 and the retaining wall 240. Furthermore, there is no need to use a halftone mask process, simplifying the manufacturing process. Moreover, material can be saved and production costs can be reduced. In addition, the width of the retaining wall 240 can also be set to be equal to the width of the auxiliary spacer 260, which can play a blocking role while ensuring no light leakage, and can also simplify the pattern of the mask plate and improve the production efficiency.

In the present application, the retaining wall 240 is made of any one of a spacer material, a color filter material, and/or a planarization layer material. Since the retaining wall 240 has a certain height, but other film layers in the display panel 200, such as insulating layers, metal layers, etc., may not necessarily be able to reach a certain height. In contrast, the spacer material, color resistance material and/or planarization layer material can be made thicker, which can reach the height required by the retaining wall 240, which has a good blocking effect on the liquid crystal 230, thereby effectively improving the display unevenness caused by the Moving mura.

The spacer material may specifically be a black matrix or a black spacer material, etc. The color filter material may be a color filter material of a red, blue, green or white color, and it can be made of one color or a mixture of at least two colors. The planarization layer material may specifically be a resin material or the like. Of course, when the retaining wall 240 is made of a color filter material, the retaining wall 240 can be formed by stacking a plurality of color filter layers of different colors. It can not only hinder the flow of the liquid crystals 230 in different partitions 243, but also play a certain role of shading, and can also prevent the phenomenon of color mixing of adjacent partitions 243, further improving the color purity of the display panel 200, thus improving the display effect.

Embodiment 2

Figure 3:
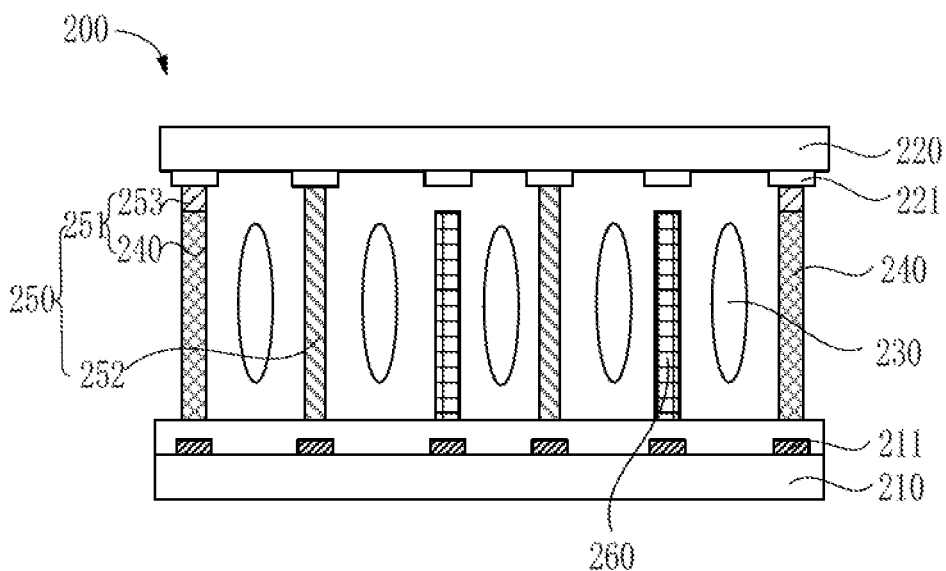
FIG. 3 is a schematic cross-sectional view of a display panel according to a second embodiment of the present application.

FIG. 3 is a schematic cross-sectional view of a display panel according to the second embodiment of the present application. Referring to FIG. 3, as the second embodiment of the present application, the difference from the first embodiment is that the material of the retaining wall 240 is identical with that of the main spacer 250. That is, the retaining wall 240 can be made of a spacer material, and the main spacer 250 includes at least a first main spacer 251. The first main spacer 251 includes a retaining wall 240 and a boss 253 disposed on the retaining wall 240. One end of the boss 253 away from the retaining wall 240 abuts against the second substrate 220.

The main spacer 250 includes a first main spacer 251 and a second main spacer 252. The second spacer 252 is disposed corresponding to the respective signal line 211 and is located in the partition 243 formed by the retaining wall 240. Two ends of the second spacer 252 are respectively abutted against the first substrate 210 and the second substrate 220 to play a supporting role. The first main spacer 251 is composed of a retaining wall 240 and a boss 253 disposed on the retaining wall 240. One end of the boss 253 away from the retaining wall 240 abuts against the second substrate 220, so that the boss 253 and the retaining wall 240 cooperate to form the first main spacer 251, which plays the role of supporting the cell. The height of the first main spacer 251 is equal to the height of the second main spacer 252. In addition, the boss 253 is only provided at a part of the retaining wall 240. In this way, the position of the retaining wall 240 corresponding to the boss 253 not only has a supporting effect, but also can prevent the partitions 243 from being too large resulting in uneven thickness of the liquid crystal 230 at the corresponding position of the retaining wall 240 due to the lack of support, which in turn leads to the problem of uneven brightness, thereby improving the display effect. Moreover, in the first main spacer 251, the boss 253 and the retaining wall 240 can be integrally formed by a halftone mask process, so that the stability of the display panel 200 is better.

In addition, since the partition wall 240 occupies a plurality of pixel regions when partitioning 243, in order to improve the cell thickness uniformity of the display panel 200, not only the second main spacer 252 is provided corresponding to each pixel region, but also the first main spacer 251 is formed corresponding to the position of the retaining wall 240 to improve the support effect of the display panel 200. In addition, the bosses 253 are only provided corresponding to a part of the retaining wall 240. Therefore, the density of the second main spacers 252 is higher than that of the first main spacers 251 to prevent unevenness of the liquid crystal 230 or poor supporting effect of the display panel 200.

Embodiment 3

Figure 4:
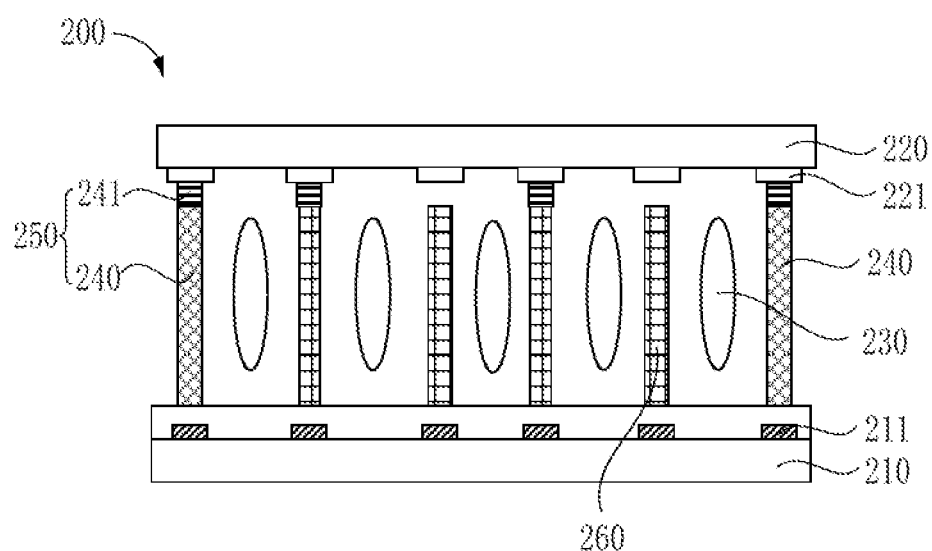
FIG. 4 is a schematic cross-sectional view of a display panel according to a third embodiment of the present application.

FIG. 4 is a schematic cross-sectional view of a display panel according to a third embodiment of the present application. Referring to FIG. 4, as the third embodiment of the present application, the difference from the first embodiment is that one end of the auxiliary spacer 260 is disposed on the first substrate 210, and the other end is suspended from the second substrate 220. The second substrate 220 is provided with a protruding structure 241, and the protruding structure 241 abuts with the auxiliary spacer 260 and/or the retaining wall 240 to form the main spacer 250.

In this embodiment, one end of the auxiliary spacer 260 is also disposed on the first substrate 210, that is, the retaining wall 240 and the auxiliary spacer 260 are both disposed on the first substrate 210. In addition, the auxiliary spacers 260 are evenly arranged in the partitions 243; they may be arranged corresponding to the signal lines 211 at the edges of each pixel region, or may be arranged corresponding to the signal lines 211 at the edges of multiple pixel regions. At this time, the protruding structures 241 are disposed on the second substrate 220 at some positions corresponding to some of the auxiliary spacers 260 and/or the retaining wall 240. When the display panel 200 is normally assembled into a cell, the protruding structures 241 abut against the auxiliary spacers 260 and/or the retaining wall 240 to form the main spacers 250, which support the two substrates at the positions corresponding to the protruding structures 241. The height and number of the protruding structures 241 can be designed according to the size of the display panel 200 and the thickness of the cell. The density of the primary spacers 250 may be greater than the density of the secondary spacers 260. Therefore, the number of the protruding structures 241 in the present application may be greater than half of the number of the auxiliary spacers 260. In addition, protruding structures 241 are disposed on the retaining wall 240 corresponding to adjacent partitions 243 or at the retaining wall 240 at the junctions of multiple partitions 243, so as to support the corresponding positions of the retaining wall 240.

Specifically, the protruding structures 241 may be small bosses disposed on the second substrate 220 facing toward the first substrate 210, and may be cylindrical, bar-shaped, square, or other special-shaped posts. In order to ensure the supporting effect of the main spacer 250, an area of a surface of the protruding structure 241 abutting against the auxiliary spacer 260 and/or the retaining wall 240 is greater than or equal to an area of a surface of the auxiliary spacer 260 and/or the retaining wall 240 abutting against the protruding structure 241. The area of the surface of the protruding structure 241 abutting against the auxiliary spacer 260 and/or the retaining wall 240 may be set to be larger than the area of the surface of the auxiliary spacer 260 and/or the retaining wall 240 abutting against the protruding structure 241 and smaller than the area of the surface of the black matrix 221 at the corresponding position. When the protruding structure 241 abuts with the auxiliary spacer 260 and/or the retaining wall 240, the surfaces abutting with each other have a certain frictional force, which can prevent the auxiliary spacer 260 and/or the retaining wall 240 and the protruding structure 241 from sliding. Moreover, due to the existence of the protruding structure 241, the standing height of the auxiliary spacer 260 and/or the retaining wall 240 is raised, and even if the auxiliary spacer 260 and/or the retaining wall 240 slides, they will not directly contact the second substrate 220. In addition, the large contact area of the protruding structures 241 can also prevent the auxiliary spacer 260 and/or the retaining wall 240 from sliding, preventing the auxiliary spacer 260 and/or the retaining wall 240 from sliding toward the pixel region and scratching the alignment film or pixel electrode, thereby avoiding the risk of abnormal display, further improving the stability of the display panel 200.

Of course, the protruding structures 241 may only be provided corresponding to the positions of some auxiliary spacers 260, but not provided corresponding to the position of the retaining wall 240. For example, when the size of the display panel 200 is relatively small, and the partitions 243 of the retaining wall 240 are also relatively small, then it may only play the role of supporting the substrate at the position corresponding to the auxiliary spacer 260 where the protruding structure 241 is provided. A certain distance is set between the retaining wall 240 and the second substrate 220, which facilitates the liquid crystal 230 to flow between the adjacent partitions 243, and can also ensure the uniformity of the liquid crystal 230. According to the size of the display panel 200, the protruding structures 241 may also be provided at the corresponding positions of the retaining wall 240 where the supporting effect needs to be ensured.

Embodiment 4

Figure 5:
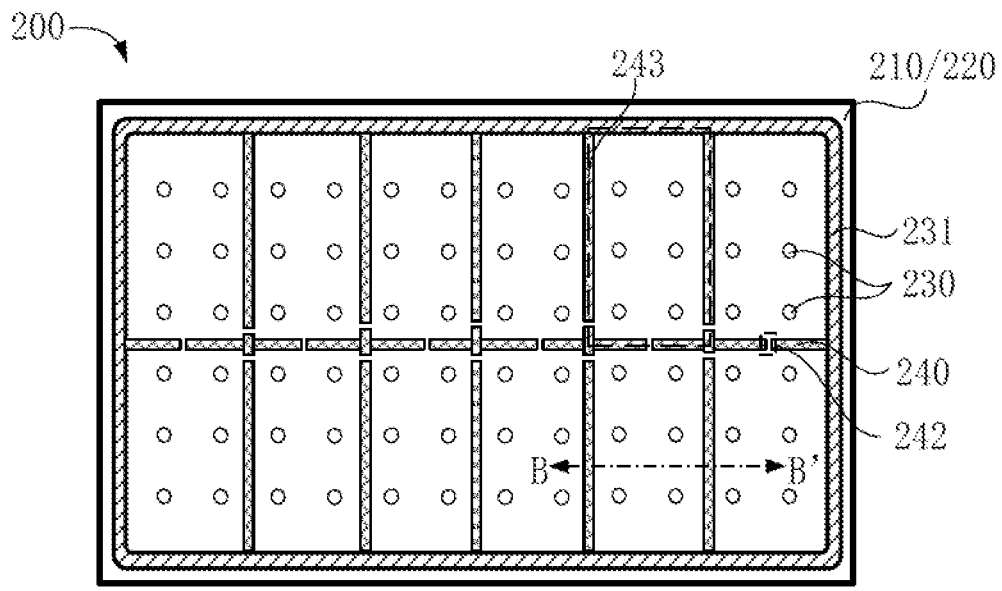
FIG. 5 is a schematic top view of a display panel according to a fourth embodiment of the present application.
Figure 6:
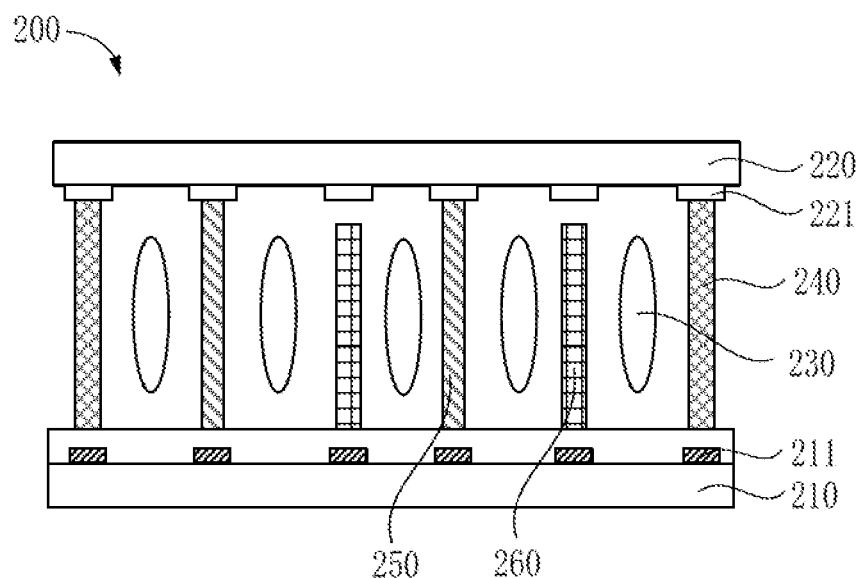
FIG. 6 is a schematic cross-sectional view taken along line B-B' of FIG. 5.

FIG. 5 is a schematic top view of a display panel according to Embodiment 4 of the present application. FIG. 6 is a schematic cross-sectional view along taken alone line B-B' of FIG. 5. As shown in FIGS. 5 and 6, as the fourth embodiment of the present application, different from the first embodiment, the display panel 200 further includes a main spacer 250 and an auxiliary spacer 260. One end of the main spacer 250 abuts the first substrate 210 and the other end abuts the second substrate 220. The height of the auxiliary spacer 260 is smaller than that of the main spacer 250. The height of the retaining wall 240 is equal to the height of the main spacer 250. The retaining wall 240 divides the display region of the display panel 200 into at least two partitions 243. At least one gap 242 is provided in the retaining wall 240 between adjacent partitions 243. The liquid crystal 230 flows between the different partitions 243 through the gap 242.

In this embodiment, the height of the retaining walls 240 is equal to the height of the main spacers 250, and at least one gap 242 is provided in the retaining wall 240 between adjacent partitions 243. The gap 242 may be located at the retaining wall 240 between two adjacent partitions 243, or may be at the junction between four adjacent partitions 243. The liquid crystals 230 in different partitions 243 can flow to each other through the gap 242. Since the height of the retaining wall 240 is equal to the height of the main spacer 250, it can play the role of supporting the panel, thus leading to a superior supporting effect of the display panel 200. Furthermore, when the liquid crystal 230 is dripped, the liquid crystal 230 can flow freely through the gap 242, which can ensure the uniformity of the liquid crystal 230 in the different partitions 243 of the display region. At the same time, the retaining wall 240 can also hinder the fluidity of part of the liquid crystal 230, thereby effectively improving the display non-uniformity phenomenon caused by the moving mura.

The gap 242 may be a gap provided along the height direction of the retaining wall 240. The height direction of the gap 242 is identical with the height direction of the retaining wall 240. At this time, the height of the gap 242 can be set to be less than or equal to the height of the retaining wall 240, as long as the liquid crystal 230 can flow between the different partitions 243 through the gap 242, which is not limited here. The width of the gap 242 (the length in the direction parallel to the first substrate 210) may be less than or equal to the width of the retaining wall 240. That is, the gap 242 is provided in a part of the length of the retaining wall 240 to ensure that the liquid crystal 230 can flow therethrough and to ensure that the liquid crystal 230 is evenly distributed in the display region. In addition, the arrangements of the main spacer 250, the auxiliary spacer 260 and the retaining wall 240 may be the same as those in the first to third embodiments, and will not be repeated here.

Figure 7:
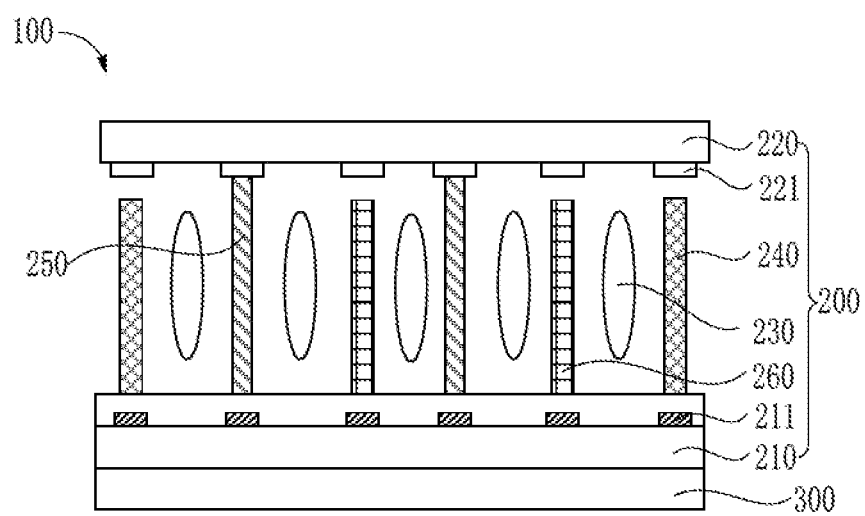
FIG. 7 is a schematic diagram of a display device of the present application.

FIG. 7 is a schematic diagram of a display device of the present application. Referring to FIG. 7, the present application further discloses a display device 100 including a backlight module 300 and any one of the display panels 200 disclosed in the present application. The backlight module 300 is disposed on a side of a light incident surface of the display panel 200.

The display device 100 of the present application may be a TV, a mobile phone, a tablet computer, or other products. Since the display device 100 of the present application is provided with the retaining wall 240, the display non-uniformity phenomenon caused by the Moving mura can be improved. The display panel 200 can withstand a certain pressure, and is especially suitable for a touch screen or a touch display panel 200 to effectively improve the display effect of the display panel 200. Moreover, the retaining wall 240 occupies a certain space, which can reduce the amount of the liquid crystal 230, thereby reducing the production cost of the display device 100, increasing the production capacity, and further enhancing the market competitiveness.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The technical solutions of the present application can be widely used in various display panels, such as TN (Twisted Nematic) display panels, IPS (In-Plane Switching) display panels, VA (Vertical Alignment) display panels, and MVA (Multi-Domain Vertical Alignment) display panels panel, which are all applicable to the above solutions.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A display panel, comprising a first substrate, a second substrate, and a liquid crystal; wherein the first substrate and the second substrate are aligned and assembled together, and wherein the liquid crystal is filled between the first substrate and the second substrate;

wherein the display panel further comprises a retaining wall that is disposed on the first substrate and that extends toward the second substrate; wherein the retaining wall divides a display region of the display panel into at least two partitions; wherein the liquid crystal is filled in the at least two partitions, and the retaining wall is operative to obstruct the liquid crystal from flowing across different partitions;

wherein the display panel further comprises a plurality of signal lines that are arranged in a crisscross pattern to form a plurality of pixel regions; wherein the retaining wall is arranged corresponding to the plurality of signal lines, and divides the display region of the display panel into a plurality of rectangular partitions; wherein a size of each of the plurality of rectangular partitions is greater than or equal to 1 cm*1 cm; wherein a size of each of the plurality of pixel regions lies in the range of 0.1 mm*0.1 mm to −0.2 mm*0.2 mm;

wherein a size of the rectangular partition corresponding to a central portion of the display region of the display panel is smaller than a size of the rectangular partition corresponding to an edge portion of the display region;

wherein the display panel further comprises a main spacer and an auxiliary spacer; wherein one end of the main spacer abuts against the first substrate, and another end of the main spacer abuts against the second substrate; wherein a height of the auxiliary spacer is less than a height of the main spacer; and wherein a height of the retaining wall is smaller than the height of the main spacer and greater than or equal to the height of the auxiliary spacer;

wherein the main spacer comprises a first main spacer and a second main spacer, wherein the first main spacer comprises the retaining wall and a boss disposed on the retaining wall, and wherein one end of the boss facing away from the retaining wall abuts against the second substrate; wherein the boss is aligned with the retaining wall along a direction perpendicular to the first substrate and the second substrate;

wherein one end of the auxiliary spacer is disposed on the first substrate, and wherein another end of the auxiliary spacer is suspended from the second substrate; wherein a protruding structure is disposed on the second substrate and abuts with the auxiliary spacer and/or the retaining wall to constitute the main spacer.

2. The display panel of claim 1, wherein the plurality of rectangular partitions each have an equal size.

3. The display panel of claim 1, further comprising a black matrix disposed corresponding to the plurality of signal lines, wherein a width of the retaining wall is smaller than or equal to a width of the black matrix.

4. The display panel of claim 1, wherein the retaining wall is made of an identical material with that of the main spacer.

5. The display panel of claim 1, wherein the retaining wall adopts any one of a spacer material, a color filter material, and/or a planarization layer material.

6. A display panel, comprising a first substrate, a second substrate, and a liquid crystal; wherein the first substrate and the second substrate are aligned and assembled together, and the liquid crystal is filled between the first substrate and the second substrate;

wherein the display panel further comprises a retaining wall that is disposed on the first substrate and that extends toward the second substrate; wherein the retaining wall divides a display region of the display panel into at least two partitions, and the liquid crystal is filled in the at least two partitions; the retaining wall is operative to obstruct the liquid crystal from flowing across different partitions;

wherein the display panel further comprises a plurality of signal lines that are arranged in a crisscross pattern to form a plurality of pixel regions; wherein the retaining wall is arranged corresponding to the plurality of signal lines and divides the display region of the display panel into a plurality of rectangular partitions; wherein a size of each of the rectangular partitions is greater than or equal to 1 cm*1 cm; wherein a size of each of the plurality of pixel regions lies in the range of 0.1 mm*0.1 mm to −0.2 mm*0.2 mm;

wherein a size of the rectangular partition corresponding to a central portion of the display region of the display panel is smaller than a size of the rectangular partition corresponding to an edge portion of the display region;

wherein the display panel further comprises a main spacer and an auxiliary spacer; wherein one end of the main spacer abuts against the first substrate, and another end of the main spacer abuts against the second substrate; wherein a height of the auxiliary spacer is less than a height of the main spacer; and wherein a height of the retaining wall is smaller than the height of the main spacer and greater than or equal to the height of the auxiliary spacer;

wherein the main spacer comprises a first main spacer and a second main spacer, wherein the first main spacer comprises the retaining wall and a boss disposed on the retaining wall, and wherein one end of the boss facing away from the retaining wall abuts against the second substrate; wherein the boss is aligned with the retaining wall along a direction perpendicular to the first substrate and the second substrate;

wherein one end of the auxiliary spacer is disposed on the first substrate, and wherein another end of the auxiliary spacer is suspended from the second substrate; wherein a protruding structure is disposed on the second substrate and abuts with the auxiliary spacer and/or the retaining wall to constitute the main spacer;

wherein the display panel further comprises a black matrix disposed corresponding to the plurality of signal lines, wherein a width of the retaining wall is smaller than or equal to a width of the black matrix.

7. A display device, comprising a backlight module and a display panel, wherein the backlight module is arranged on a side of a light incident surface of the display panel; the display panel comprises a first substrate, a second substrate, and a liquid crystal, wherein the first substrate and the second substrate are aligned and assembled together, and the liquid crystal is filled between the first substrate and the second substrate;

wherein the display panel further comprises a retaining wall that is disposed on the first substrate and that extends toward the second substrate; wherein the retaining wall divides a display region of the display panel into at least two partitions, and the liquid crystal is filled in the at least two partitions; the retaining wall is operative to obstruct the liquid crystal from flowing across different partitions;

wherein the display panel further comprises a plurality of signal lines that are arranged in a crisscross pattern to form a plurality of pixel regions; wherein the retaining wall is arranged corresponding to the plurality of signal lines and divides the display region of the display panel into a plurality of rectangular partitions; and wherein a size of each of the rectangular partitions is greater than or equal to 1 cm*1 cm; wherein a size of each of the plurality of pixel regions lies in the range of 0.1 mm*0.1 mm to −0.2 mm*0.2 mm;

wherein a size of the rectangular partition corresponding to a central portion of the display region of the display panel is smaller than a size of the rectangular partition corresponding to an edge portion of the display region;

wherein the display panel further comprises a main spacer and an auxiliary spacer; wherein one end of the main spacer abuts against the first substrate, and another end of the main spacer abuts against the second substrate; wherein a height of the auxiliary spacer is less than a height of the main spacer; and wherein a height of the retaining wall is smaller than the height of the main spacer and greater than or equal to the height of the auxiliary spacer;

wherein the main spacer comprises a first main spacer and a second main spacer, wherein the first main spacer comprises the retaining wall and a boss disposed on the retaining wall, and wherein one end of the boss facing away from the retaining wall abuts against the second substrate; wherein the boss is aligned with the retaining wall along a direction perpendicular to the first substrate and the second substrate;

wherein one end of the auxiliary spacer is disposed on the first substrate, and wherein another end of the auxiliary spacer is suspended from the second substrate; wherein a protruding structure is disposed on the second substrate and abuts with the auxiliary spacer and/or the retaining wall to constitute the main spacer.

8. The display panel of claim 1, wherein the boss and the retaining wall are integrally formed.

9. The display panel of claim 1, wherein a density of the second main spacers is greater than that of the first main spacers.

10. The display panel of claim 1, wherein a number of the protruding structures is greater than a half of a number of the auxiliary spacers.

11. The display panel of claim 3, wherein an area of a surface of the protruding structure that abuts against the auxiliary spacer is set to be larger than an area of a surface of the auxiliary spacer that abuts against the protruding structure and smaller than an area of a surface of the black matrix at a corresponding position.

12. The display panel of claim 3, wherein an area of a surface of the protruding structure that abust against the retaining wall is set to be larger than an area of a surface of the retaining wall that abuts against the protruding structure and smaller than an area of a surface of the black matrix at a corresponding position.

* * * * *